(12) United States Patent
Yamamoto

(10) Patent No.: US 10,792,715 B2
(45) Date of Patent: Oct. 6, 2020

(54) GEAR SPINDLE AND OIL SEAL USED THEREIN

(71) Applicant: PRIMETALS TECHNOLOGIES JAPAN, LTD., Tokyo (JP)

(72) Inventor: Kenji Yamamoto, Hiroshima (JP)

(73) Assignee: PRIMETALS TECHNOLOGIES JAPAN, LTD., Tokyo (JP)

( * ) Notice: Subject to any disclaimer, the term of this patent is extended or adjusted under 35 U.S.C. 154(b) by 275 days.

(21) Appl. No.: 15/870,577

(22) Filed: Jan. 12, 2018

(65) Prior Publication Data

US 2018/0133767 A1     May 17, 2018

Related U.S. Application Data

(62) Division of application No. 14/424,582, filed as application No. PCT/JP2012/072107 on Aug. 31, 2012, now Pat. No. 10,016,798.

(51) Int. Cl.
     *B21B 35/14*      (2006.01)
     *F16D 3/18*      (2006.01)
     (Continued)

(52) U.S. Cl.
     CPC .............. *B21B 35/147* (2013.01); *F16D 3/10* (2013.01); *F16D 3/185* (2013.01); *F16D 3/845* (2013.01);
     (Continued)

(58) Field of Classification Search
     CPC ......... B21B 35/147; F16D 3/845; F16D 3/10; F16D 3/185; F16D 2300/06; F16D 2300/08; F16D 3/84; Y10S 277/905
     (Continued)

(56) References Cited

U.S. PATENT DOCUMENTS 2,841,966 A  *  7/1958   Belden .................... F16D 3/185
3,427,825 A     2/1969   John et al.
(Continued)

FOREIGN PATENT DOCUMENTS

CN        102032283 A     4/2011
GB        2 259 349 A     10/1993
(Continued)

OTHER PUBLICATIONS

Chinese Office Action dated May 9, 2016 issued in corresponding Chinese Application No. 201280075431.3.
(Continued)

*Primary Examiner* — Greg Binda
(74) *Attorney, Agent, or Firm* — Birch, Stewart, Kolasch & Birch, LLP.

(57) ABSTRACT

In a gear spindle, outer cylinder gear sections (11) are each integrally formed on an inner peripheral surface of a spindle outer cylinder and inner cylinder gear sections (14) are each integrally formed on an outer peripheral surface of a spindle inner cylinder (13). An oil seal (27) that seals in the lubricating oil (20) for each of the aforementioned gear sections includes, a seal body (29) having a channel-shaped cross section and interposed in the peripheral gap between the inner peripheral surface of the spindle outer cylinder and the outer peripheral surface of the spindle inner cylinder (13), and a seal mounting member (30) that includes a band, a spring, or the like that tightens and fixes the seal body to the outer peripheral surface of the spindle inner cylinder (13) to allow expansion of the seal body in the axial direction in the aforementioned peripheral gap.

4 Claims, 5 Drawing Sheets

(51) Int. Cl.
*F16D 3/10* (2006.01)
*F16D 3/84* (2006.01)

(52) U.S. Cl.
CPC ....... *F16D 2300/06* (2013.01); *Y10S 277/905* (2013.01)

(58) Field of Classification Search
USPC .......................................... 277/604, 651, 905
See application file for complete search history.

(56) References Cited

U.S. PATENT DOCUMENTS

| | | | |
|---|---|---|---|
| 3,583,244 A | 6/1971 | Teinert | |
| 4,172,599 A | 10/1979 | Forch | |
| 4,176,540 A | 12/1979 | Barber | |
| 4,305,596 A | 12/1981 | Unterstrasser | |
| 5,941,535 A * | 8/1999 | Richard | E03F 5/02 277/604 |
| 9,879,731 B2 * | 1/2018 | Yamamoto | B21B 35/14 |
| 2002/0132674 A1 * | 9/2002 | Mohr | F16D 3/845 |
| 2010/0219586 A1 | 9/2010 | McGinnity | |
| 2011/0287845 A1 | 11/2011 | Downey et al. | |

FOREIGN PATENT DOCUMENTS

| | | |
|---|---|---|
| JP | 28-4952 B1 | 10/1953 |
| JP | 34-6151 B1 | 7/1959 |
| JP | 54-29408 Y2 | 9/1979 |
| JP | 58-85405 U | 6/1983 |
| JP | 60-37493 Y2 | 11/1985 |
| JP | 62-2837 U | 1/1987 |
| JP | 2-41770 U | 3/1990 |
| JP | 6-3226 Y2 | 1/1994 |
| JP | 8-21453 A | 1/1996 |
| JP | 2678259 B2 | 11/1997 |
| JP | 2006-83962 A | 3/2006 |
| SU | 1518582 A1 | 10/1989 |
| WO | WO 2006/030855 A1 | 3/2006 |

OTHER PUBLICATIONS

Extended European Search Report dated Jul. 4, 2016 in corresponding EP Application No. 12883855.4.

* cited by examiner

GEAR SPINDLE AND OIL SEAL USED THEREIN

This application is a Divisional of application Ser. No. 14/424,582, filed on Apr. 20, 2015, now U.S. Pat. No. 10,016,798, which is a National Phase of PCT International Application No. PCT/JP2012/072107 filed on Aug. 31, 2012, all of which are hereby expressly incorporated by reference into the present application.

TECHNICAL FIELD

The present invention relates to a gear spindle optimal for reducing the diameter thereof and an oil seal used therein.

BACKGROUND ART

For example, in a rolling mill, upper and lower work rolls are rotated by upper and lower drive shafts via gear spindles (a type of a gear-type universal joint) slanted vertically by a slant angle θ (θ=0 to 3 degrees), so that the rolling mill rolls a strip.

A conventional gear spindle of this type is shown in FIG. 6 as an example (see Patent Document 1).

In this gear spindle in FIG. 6, reference numerals 100 and 101 respectively denote a spindle inner cylinder and a spindle outer cylinder, and the shaft axis of the spindle inner cylinder 100 is slanted by a slant angle θ relative to the shaft axis of the spindle outer cylinder 101. Reference numeral 102 in FIG. 6 is a hub, and a gear portion (external teeth) 102a is provided on an outer periphery of the hub 102. A communication hole 102b is formed, penetrating the gear portion 102a. The hub 102 is fitted around an end portion of the spindle inner cylinder 100 such that the hub 102 is allowed to slide axially by a spline 103.

An end portion of the spindle outer cylinder 101 on the rolling mill side is detachably fitted around an oval portion 104a of a work roll 104, and an annular Y-seal 105 is attached to an end portion of the spindle outer cylinder 101 on the driving device side via a seal case 106 such that the Y-seal 105 is movable radially. A gear portion 101a provided on an inner periphery of the spindle outer cylinder 101 meshes with the gear portion 102a of the hub 102 in such a manner as to be slidable axially. An oil-supply-side oil chamber 107 and a seal-side oil chamber 108 are formed with the meshing portion between the gear portions 101a, 102a being the border therebetween. A lubricant 110 is supplied into the oil-supply-side oil chamber 107 through an oil supply hole 109 formed in the inner periphery of the spindle outer cylinder 101. In FIG. 6, reference numeral 111 denotes a boot-shaped seal, 112 denotes an inner-cylinder pivot (thrust pin), 113 denotes a helical compression spring, and 114 denotes a stopper.

According to the above configuration, a rotary torque of a drive shaft is transmitted from the spindle inner cylinder 100 slanted at the slant angle θ, to the hub 102 via the spline 103, and therefrom, transmitted to the spindle outer cylinder 101 via the gear portions 101a, 102a at same velocity. The work roll 104 is thereby rotated. Meanwhile, the gear portions 101a, 102a are lubricated over their entire peripheries with the lubricant 110 so that they may undergo less wear and generate less heat.

PRIOR ART DOCUMENT

Patent Document

Patent Document 1: Japanese Patent Application Publication No. H08-21453

SUMMARY OF THE INVENTION

Problems to be Solved by the Invention

To meet recent needs, a work roll which is much smaller than a conventional one (e.g., Min φ300 mm→Min φ230 mm) is being used in order to roll a special steel made of a hard material (such as a stainless steel and etc.) with high productivity and high product quality.

This requires the outer diameter of the gear spindle for driving the work roll to be reduced to, for example, φ225 mm. However, reducing the diameter of the gear spindle causes new problems of having to: increase the strength of the overall spindle including its teeth, shaft, and the like; ensure adequate torque transmission capacity; and ensure sealability of and prevent damage of the oil seal during operation at high rotational speed for achieving high production volume with the small-diameter roll.

However, for the following reasons, there is naturally a limit to reduction of the diameter of the gear spindle having a structure disclosed in Patent Document 1. First of all, from a perspective of assemblability of the Y-seal 105, the boot-shaped seal 111, and the like, the spindle inner cylinder portion is divided into the spindle inner cylinder 100 and the hub 102 with the gear portion 102a, and the spindle inner cylinder 100 and the hub 102 engage with each other via the spline 103. Torque transmission is thus performed in two stages, which lowers the torque transmission capacity. Hence, high torque transmission cannot be expected. Moreover, increase in the number of components makes the structure complicated. There is also a problem of strength.

Moreover, since the gear spindle is slanted, a following speed allowable for the Y-seal 105 (also true to an O-ring) is exceeded during high-speed rotation. By the exceeded following amount allowable for the Y-seal 105, a gap is formed or damage occurs between the Y-seal 105 and the spindle inner cylinder portion. This leads to a trouble of the lubricant leaking from the gap or damaged portion. The boot-shaped seal 111 is provided as a backup measure for such a trouble. However, this boot-shaped seal 111 is placed axially outside of the spindle outer cylinder portion, and a seal attachment member for an inner ring portion thereof is placed on a side having no lubricant. Hence, the boot-shaped seal 111 comes into contact with and damages a seal attachment such as a bolt or adjacent components when expanding due to the centrifugal force of the lubricant oil during the rotation of the gear spindle.

Generally, bellows are used as an oil seal in a typical gear spindle. The bellows are also placed axially outside of the spindle outer cylinder portion. Hence, the bellows expands due to the centrifugal force of the lubricant during the rotation of the gear spindle. Consequently, the lubricant for the gear portions decrease to make lubricating conditions unfavorable, and the bellows come into contact with and damage a seal attachment such as a bolt or an oil seal of a vertically-opposite gear spindle.

The present invention has been proposed in consideration of such circumstances, and has an objective of providing: a gear spindle which is optimal for reducing the diameter thereof, which can ensure adequate strength and high torque transmission capacity, and which ensures sealability of and prevents damage of an oil seal during operation at high rotational speed; and an oil seal used in the gear spindle.

Means for Solving the Problems

A gear spindle according to the present invention for solving the above problems is a gear spindle including an outer-cylinder portion with a gear portion carved on an inner peripheral surface thereof and an inner cylinder portion with a gear portion carved on an outer peripheral surface thereof, the gear portions meshing with each other, the gear spindle being configured to rotate with shaft axes of the outer cylinder portion and the inner cylinder portion being slanted relative to each other at a slant angle θ, wherein: the gear portion of the outer cylinder portion is formed integrally with the inner peripheral surface thereof, while the gear portion of the inner cylinder portion is formed integrally with the outer peripheral surface thereof; and an oil seal configured to seal a lubricating oil for the gear portions includes a seal body interposed in a peripheral gap between the inner peripheral surface of the outer cylinder portion and the outer peripheral surface of the inner cylinder portion, and a seal attachment member configured to tighten the seal body securely to the outer peripheral surface of the inner cylinder portion such that the seal body is expandable in the peripheral gap between the inner peripheral surface of the outer cylinder portion and the outer peripheral surface of the inner cylinder portion.

Further, in the gear spindle, seal-neighboring components including the seal attachment member are placed at positions not interfering with the seal body when the seal body expands.

Further, in the gear spindle, an axial travel distance B (mm) of the outer cylinder portion is within a range expressed by the following formula:

$$B<(D/2)\times\sin\theta+A,$$

where

D is an outer diameter (mm) of the inner cylinder portion at the gear portion thereof, θ is a maximum slant angle (deg), and A is a constant (mm) determined considering an error in machining components of the gear spindle, an error in assembly of the components, and an oscillatory displacement due to rotation.

Further, in the gear spindle, an outer diameter of the inner cylinder portion at an oil seal attachment portion thereof is smaller than outer diameters of portions of the inner cylinder portion located on both sides of the oil seal attachment portion in an axial direction, the portions being the gear portion and a portion on a drive shaft side; and the oil seal is attachable by diametrical extension and contraction of the seal body. In other words, the outer diameter of the gear portion located at one end of the inner cylinder portion has to be larger than the outer diameter of the oil seal attachment portion for reasons of the strength of the gear portion, and the outer diameter of a portion of the inner cylinder portion located on the other end of the inner cylinder portion and coupled to the drive shaft has to be larger than the outer diameter of the oil seal attachment portion for reasons of shaft coupling strength. To permit these differences in diameter of the portions of the inner cylinder portion, the seal body of the oil seal diametrically extends and contracts.

Further, in the gear spindle, in that the outer diameter of the oil seal attachment portion is different from a diameter of a base of the gear portion of the inner cylinder. In other words, the outer diameter of the oil seal attachment portion is a value independent of the diameter of the base of the inner cylinder gear portion.

An oil seal according to the present invention for solving the above problems is an oil seal used in the gear spindle described above and comprises: the seal body including an outer ring portion having high rigidity and being configured to come into contact with the inner peripheral surface of the outer cylinder portion, an inner ring portion having lower rigidity than the outer ring portion and being configured to come into contact with the outer peripheral surface of the inner cylinder portion, and an intermediate ring portion connecting the outer ring portion and the inner ring portion to each other and being excellent in flexibility; and the seal attachment member configured to attach the inner ring portion to the inner cylinder portion.

Further, in the oil seal, the seal attachment member is a solid band or a highly rigid spring.

Further, in the oil seal, the seal attachment member is placed on a side having the lubricating oil.

Further, in the oil seal, a reinforcement ring is provided in the outer ring portion to give rigidity to the outer ring portion.

Further, in the oil seal, the reinforcement ring is divided into multiple pieces and arranged in a width direction of the outer ring portion.

Further, in the oil seal, at least one of end portions of the outer ring portion in the width direction is formed in a wedge shape, and the outer ring portion is retained by a wedge-shaped retention member coinciding in shape with the wedge shape of the end portion of the outer ring portion.

Further, in the oil seal, the intermediate ring portion forms a U shape having a single large arc.

Effect of the Invention

In the gear spindle according to the present invention, for example, the shaft portion and the gear portion of the inner cylinder portion are not divided with a spline structure or the like, and the gear portion of the outer cylinder portion is formed integrally with the inner peripheral surface thereof, and the gear portion of the inner cylinder portion is formed integrally with the outer peripheral surface thereof. Thus, the gear spindle can have adequate strength and high torque transmission capacity. Moreover, the seal body of the oil seal is compactly interposed in the peripheral gap between the inner peripheral surface of the outer cylinder portion and the outer peripheral surface of the inner cylinder portion, and the seal body is attached by use of the seal attachment member such that the seal body can expand in the aforementioned peripheral gap. Thus, the sealability of the oil seal as well as prevention of damage of the oil seal can be achieved during operation at high rotational speed. The above configurations are optimal for reducing the diameter of the gear spindle.

In the oil seal according to the present invention, high attachment strength is obtained by the highly-rigid outer ring portion and the inner ring portion attached by use of the seal attachment member, so that the sealability during operation at high rotation speed is ensured. Moreover, the highly-flexible intermediate ring portion facilitates assemblage. Further, the seal attachment member is placed on the side having the lubricating oil, and the seal body is attached in such a manner as to be expandable in the peripheral gap between the inner peripheral surface of the outer cylinder portion and the outer peripheral surface of the inner cylinder portion without interfering with adjacent components. Thus, interference of the oil seal with the seal attachment member or the seal-neighboring component is avoided to achieve damage prevention. These configurations make the oil seal optimal for use in the gear spindle which is small in diameter.

MODE FOR CARRYING OUT THE INVENTION

Embodiments of a gear spindle and an oil seal used therein are described in detail below using the drawings.

Embodiment 1

Figure 1:
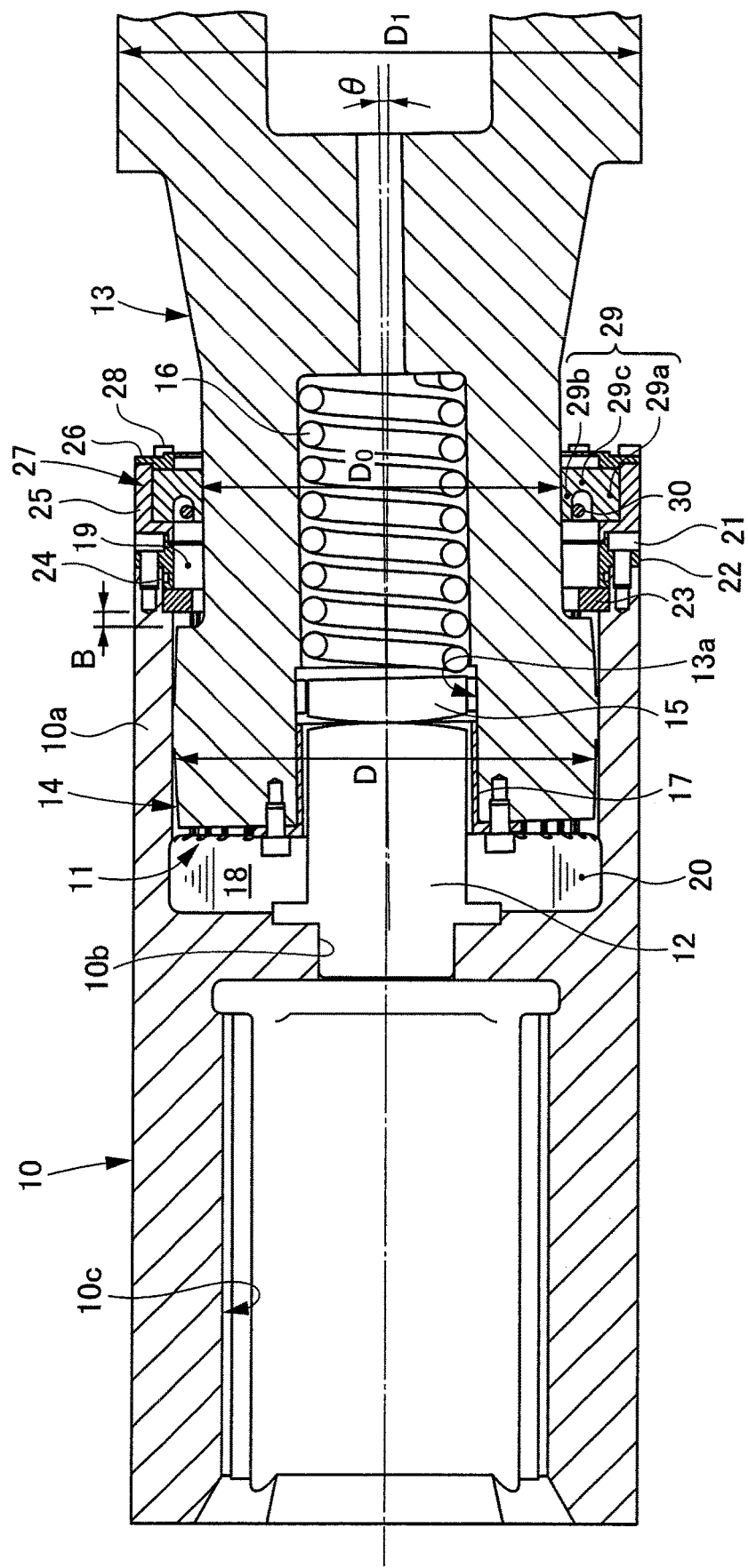
FIG. 1 is a sectional view of a main portion of a gear spindle showing Embodiment 1 of the present invention.

FIG. 1 is a sectional view of a main portion of a gear spindle showing Embodiment 1 of the present invention.

As shown in FIG. 1, a large-diameter cylindrical portion (constituting part of an outer cylinder portion) 10a is formed in one (right) half portion of a spindle outer cylinder 10, and a fit hole 10c is formed in the other (left) half portion of the spindle outer cylinder 10, the fit hole 10c being separated from the large-diameter cylindrical portion 10a by a center-portion partition wall.

An outer cylinder gear portion (internal teeth) 11 is integrally formed on an axially-middle portion of the large-diameter cylindrical portion 10a. A spindle of a work roll of a rolling mill (not shown) can be fitted into the fit hole 10c such that the spindle can be attached and detached (inserted and removed) and cannot be rotated. A base end portion of an outer-cylinder pivot 12 is fitted into a hole 10b in the center-portion partition wall of the outer cylinder.

One (left) end portion of a spindle inner cylinder (inner cylinder portion) 13 configured to be rotated by a drive shaft (device) (not shown) is inserted into the large-diameter cylindrical portion 10a, and an inner cylinder gear portion (outer teeth) 14 integrally formed on an axial end of the spindle inner cylinder 13 meshes with the outer cylinder gear portion 11 in such a manner as to be slidable axially. The shaft axis of the spindle inner cylinder 13 is slanted by a slant angle θ relative to the shaft axis of the spindle outer cylinder 10.

A tip portion of the outer-cylinder pivot 12 is loosely fit into a cylinder hole 13a of the spindle inner cylinder 13, and an inner-cylinder pivot 15 is housed in the cylinder hole 13a of the spindle inner cylinder 13 while being in spherical contact with the outer-cylinder pivot 12 and biased by a helical compression spring 16 toward the outer-cylinder pivot 12. Thus, the spindle outer cylinder 10 is constantly biased toward the work roll side to maintain their fitted state. Reference numeral 17 in FIG. 1 is a stopper configured to prevent the inner-cylinder pivot 15 from coming off.

In the large-diameter cylindrical portion 10a of the spindle outer cylinder 10, an oil-supply-side oil chamber 18 and a seal-side oil chamber 19 are defined with a portion of the outer cylinder gear portion 11 and the inner cylinder gear portion 14 being a border therebetween. Lubricating oil 20 is supplied into the oil-supply-side oil chamber 18 through a cylinder hole (not shown) of the spindle outer cylinder 10.

A halved stopper ring 23 is attached to an opening-end portion of the large-diameter cylindrical portion 10a via a flanged, cylindrical coupling cover (constituting part of the outer cylinder portion) 22 which is coupled to an end surface of the large-diameter cylindrical portion 10a with multiple bolts 21. The stopper ring 23 restricts an axial travel distance B (mm) of the spindle outer cylinder 10 during roll change. Reference numeral 24 is a seal member such as an O-ring.

The axial travel distance B (mm) of the spindle outer cylinder 10 is set within the following formula:

$$B < (D/2) \times \sin\theta + A$$

(A is for example 5), where

D is the outer diameter (mm) of the spindle inner cylinder 13 at the inner cylinder gear portion 14, θ is a maximum slant angle (deg), and A is a constant (mm) determined considering an error in machining of components of the gear spindle, an error in assemblage of the components, and an oscillatory displacement due to rotation.

A flanged, cylindrical seal case (constituting part of the outer cylinder portion) 25 is connected to (the end surface of) the coupling cover 22 by a spigot joint, and an oil seal 27 is interposed, via a seal plate 26, in a peripheral gap between the inner peripheral surface of the seal case 25 and the outer peripheral surface of the spindle inner cylinder 13 (see an outer diameter $D_0$ (mm) ($D_0 < D$) of an oil seal attachment portion in FIG. 1), the oil seal 27 being made of a rubber or the like and configured to seal the lubricating oil 20 in the oil-supply-side oil chamber 18 and the seal-side oil chamber 19. The seal case 25 and the seal plate 26 are together fastened to the end surface of the coupling cover 22 with multiple bolts 28. The seal plate 26 may be an integral component or a halved component.

The oil seal 27 includes a seal body 29 interposed in the aforementioned peripheral gap and a seal attachment member 30 configured to tighten the seal body 29 securely to the outer peripheral surface of the spindle inner cylinder 13 such that the seal body 29 can expand inside the aforementioned peripheral gap. In the example shown in FIG. 1, the oil seal 27 includes: the seal body 29 having a channel-shaped cross section and having an outer ring portion 29a which comes into contact with the inner peripheral surface of the seal case 25 and has high rigidity, an inner ring portion 29b which comes into contact with the outer peripheral surface of the spindle inner cylinder 13 and has rigidity lower than that of the outer ring portion 29a, and an intermediate ring portion 29c which connects the outer ring portion 29a and the inner ring portion 29b to each other and has excellent flexibility; and the seal attachment member 30 formed of a highly-rigid spring and configured to attach the inner ring portion 29b to the spindle inner cylinder 13. The outer ring portion 29a thus configured is pressed against the inner peripheral surface of the seal case 25 due to an internal pressure of the lubricating oil 20 generated by rotation. Thus, the outer ring portion 29a provided for the purpose of preventing leakage of the lubricating oil 20 can satisfy its function with a simple structure, and is suitable for a small-diameter spindle having a small space.

The seal attachment member 30 is placed on a side having the lubricating oil 20, and a predetermined gap is set between an inner-peripheral plate portion (seal-neighboring component) of the seal plate 26 and the intermediate ring portion 29c. Thus, even if the centrifugal force of the lubricating oil 20 generated during rotation of the gear spindle causes the intermediate ring portion 29c of the seal body 29 to expand axially to an opposite side to the side having the lubricating oil 20, the intermediate ring portion 29c does not interfere (come into contact) with not only the seal attachment member 30 but also the inner-peripheral plate portion of the seal plate 26. Further, the inner ring portion 29b configured as above is pressed against the outer peripheral surface of the spindle inner cylinder 13 due to an internal pressure of the lubricating oil 20 generated by rotation. Thus, the seal attachment member 30 provided for the purpose of fixing the inner ring portion 29b to the outer peripheral surface of the spindle inner cylinder 13 and preventing leakage of the lubricating oil 20 can satisfy its function with a compact and simple structure, and is suitable for a small-diameter spindle having a small space.

The outer diameter $D_0$ (mm) of the oil seal attachment portion of the spindle inner cylinder 13 is set to be smaller than the diameters of portions located on both sides of the oil seal attachment portion in the axial direction, namely, the outer diameter D (mm) of the spindle inner cylinder 13 at the inner cylinder gear portion 14 and an outer diameter $D_1$ (mm) of a portion of the spindle inner cylinder 13 on the drive-shaft side. When the oil seal 27 is to be attached, the seal body 29 (exactly, the intermediate ring portion 29c and the inner ring portion 29b) diametrically extends and contracts to enable the attachment of the oil seal 27.

The inner ring portion 29b is given low rigidity so as to be expandable. Since adequate sealability between the inner ring portion 29b and the spindle inner cylinder 13 cannot be offered with such an inner ring portion 29b only, sealability is ensured by fixing the inner ring portion 29b to the outer peripheral surface of the spindle inner cylinder 13 by use of the highly-rigid seal attachment member 30 which is a separate component from the seal body 29.

Further, the outer ring portion 29a is required to provide high sealability between the outer ring portion 29a and the seal case 25, and therefore to have high rigidity. The inner ring portion 29b is required to provide high sealability between the inner ring portion 29b and the spindle inner cylinder 13 and to diametrically extend and contract so that the oil seal 27 can be attached after passing beyond both end portions of the spindle inner cylinder 13. Further, the intermediate ring portion 29c is required to have strength to overcome the internal pressure, to have flexibility to follow the slant of the spindle inner cylinder 13, and to diametrically extend and contract so that the oil seal 27 can be attached after passing beyond both end portions of the spindle inner cylinder 13. As described, each portion of the oil seal has its own requirements, and therefore has to be designed taking those requirements into consideration.

An assembly procedure for the oil seal 27 is briefly described. First, the seal plate 26 and the seal case 25 are sequentially inserted into the spindle inner cylinder 13. Next, the oil seal 27 is attached to the spindle inner cylinder 13 by diametrically extending and contracting the oil seal 27 and passing beyond the inner cylinder gear portion 14, and is tightened securely and fixed with the seal attachment member 30. Next, the coupling cover 22 is inserted into the spindle inner cylinder 13, and then the spindle inner cylinder 13 is inserted into the spindle outer cylinder 10. Next, the halved stopper ring 23 is attached to the coupling cover 22, and then the coupling cover 22 is attached to the spindle outer cylinder 10. Next, the seal case 25 is attached to the coupling cover 22 by passing beyond the oil seal 27, and then the seal plate 26 is attached to the seal case 25.

With such a configuration, rotary torque of the drive shaft is transmitted at same velocity from the spindle inner cylinder 13 slanted at the slant angle θ to the spindle outer cylinder 10 via the inner cylinder gear portion 14 and the outer cylinder gear portion 11 meshing therewith. The work roll is thus rotated. Meanwhile, the meshing portion of the inner cylinder gear portion 14 and the outer cylinder gear portion 11 is lubricated with the lubricating oil 20 over their entire peripheries to undergo less wear and generate less heat.

In this embodiment, the spindle outer cylinder 10 (exactly, the large-diameter cylindrical portion 10a) has the outer cylinder gear portion 11 formed integrally with the inner peripheral surface thereof, and the spindle inner cylinder 13 has the inner cylinder gear portion 14 formed integrally with the outer peripheral surface thereof. Thus, the gear spindle has surely adequate strength and high torque transmission capacity.

Moreover, the seal body 29 of the oil seal 27 is interposed compactly in the peripheral gap between the inner peripheral surface of the seal case 25 and the outer peripheral surface of the spindle inner cylinder 13, and the seal body 29 is attached by use of the seal attachment member 30 such that the seal body 29 can expand inside the aforementioned peripheral gap. This can ensure the sealability of and prevent damage of the oil seal 27 during operation at high rotational speed.

To be more specific, since the inner ring portion 29b of the seal body 29 is tightened securely and fixed to the spindle inner cylinder 13 by use of the seal attachment member 30 having high rigidity, the spindle inner cylinder 13 can offer adequate sealability even during operation at high rotational speed in which the spindle inner cylinder 13 is slanted at the slant angle θ.

Further, the seal attachment member 30 is placed on the side having the lubricating oil 20, and the predetermined gap is set between the inner-peripheral plate portion of the seal plate 26 and the intermediate ring portion 29c. Thus, even if the centrifugal force of the lubricating oil 20 generated during operation at high rotational speed causes the intermediate ring portion 29c of the seal body 29 to expand axially as described above, the intermediate ring portion 29c does not interfere (come into contact) with not only the seal attachment member 30 but also the inner-peripheral plate portion of the seal plate 26. Thus, damage of the seal body 29 can be avoided.

Moreover, the stopper ring 23 whose position is determined by the formula described earlier restricts the axial travel distance B (mm) of the spindle outer cylinder 10 during roll change to a minimum and prevents abnormal expansion of the intermediate ring portion 29c due to an increase in the internal pressure of the seal-side oil chamber 19. Thus, prevention of damage of the seal body 29 is further fostered. Moreover, the intermediate ring portion 29c of the seal body 29 can be reduced in thickness because the increase in the internal pressure of the seal-side oil chamber 19 is suppressed.

In other words, the reduction in the thickness of the intermediate ring portion 29c can give high flexibility to the intermediate ring portion 29c, and therefore the oil seal 27 can easily pass beyond the inner cylinder gear portion 14 of the spindle inner cylinder 13 by the diametrical extension and contraction of the seal body 29. This further improves assemblability.

As a result, the gear spindle can be reduced in diameter, allowing a special steel made of a hard material (such as a stainless steel) to be rolled with high productivity and high product quality.

Embodiment 2

Figure 2:
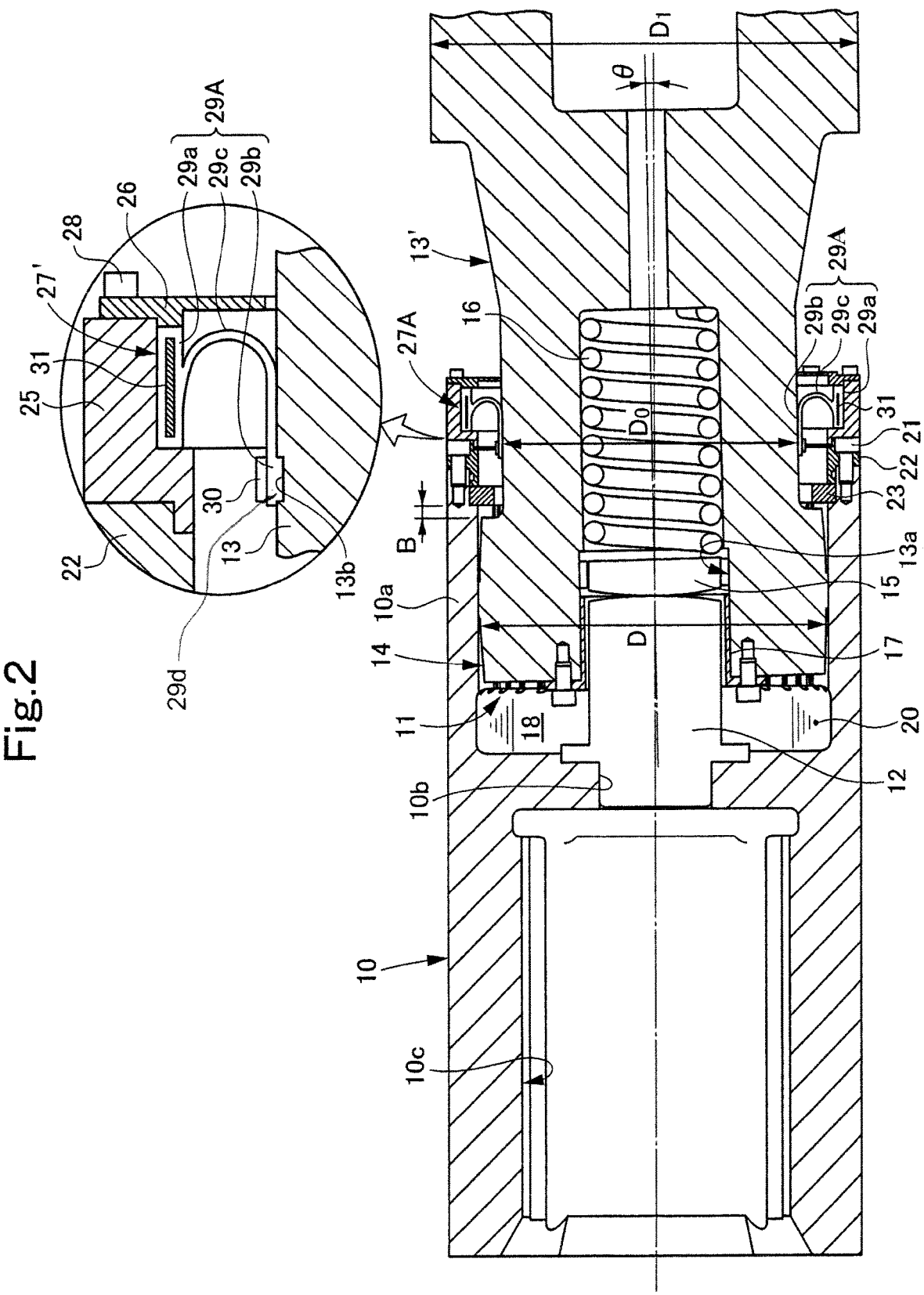
FIG. 2 is a sectional view of a main portion of a gear spindle showing Embodiment 2 of the present invention.

FIG. 2 is a sectional view of a main portion of a gear spindle showing Embodiment 2 of the present invention.

In this embodiment, an oil seal 27' is a modified seal 27 of Embodiment 1 above such that the intermediate ring portion 29c of a seal body 29A is formed in a U shape with a single large arc and formed to be thin and long as much as possible, and that a reinforcement ring 31 is embedded in an outer ring portion 29a. In addition, an annular groove 13b that receives an annular protruding portion 29d formed in an inner ring portion 29b for positioning of the seal attachment member 30 is formed in an outer peripheral surface of the spindle inner cylinder 13', and a solid band is used as the seal attachment member 30. Other configurations are the same as Embodiment 1 except for the above points. Thus, components and portions that are the same as those in FIG. 1 are denoted by the same reference numerals as those used in FIG. 1, and are not described again here.

This configuration offers the following advantages in addition to similar operation and advantageous effects achieved by Embodiment 1. Specifically, since the intermediate ring portion 29c is formed in a U shape with a single large arc, seal-generating stress is lessened. If multiple small arc-shaped seals are employed, more stress is generated by the seals, shortening the lifetime. In addition, forming the intermediate ring portion 29c to be thin and long as much as possible increases the flexibility of an oil seal 27' and thus improves assemblability. On the other hand, embedding the reinforcement ring 31 in the outer ring portion 29a improves the sealability of the oil seal 27' by avoiding degradation of the rigidity of the outer ring portion 29a (the degradation of the rigidity occurs because the outer ring portion 29a has to be thin due to limitation of its attachment space caused by forming the intermediate ring portion 29c in an U shape with a single larger arc).

Embodiment 3

Figure 3:
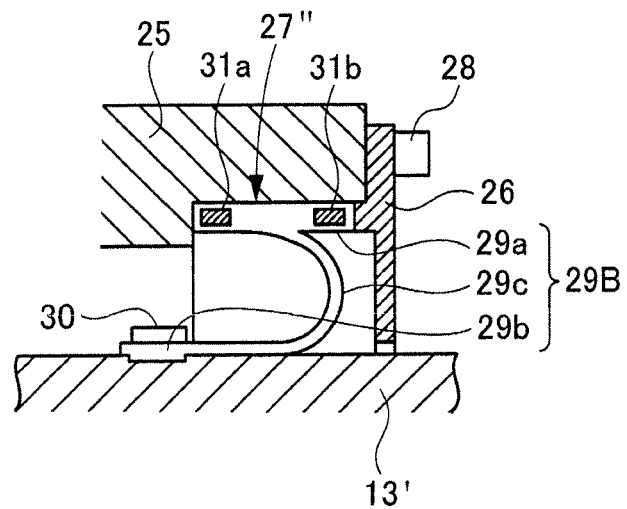
FIG. 3 is a sectional view of an oil seal portion showing Embodiment 3 of the present invention.

FIG. 3 is a sectional view of an oil seal portion showing Embodiment 3 of the present invention.

In this embodiment, an oil seal 27'' is a modified oil seal 27' of Embodiment 2 above such that multiple (for example "two" as shown in FIG.) reinforcement rings 31a, 31b are embedded in the outer ring portion 29a, the reinforcement rings 31a, 31b being divided in a width direction (the axial direction of the gear spindle). Other configurations are the same as Embodiment 2. Thus, components and portions that are the same as those in FIG. 2 are denoted by the same reference numerals as those used in FIG. 2, and are not described again here.

According to this configuration, the following advantages are offered in addition to similar operation and advantageous effects offered by Embodiment 2. Specifically, embedding the reinforcement rings 31a, 31b ensures rigidity of the outer ring portion 29a, and because no reinforcement ring is provided in the outer ring portion 29a at the base portion of the intermediate ring portion 29c, stress at this portion can be mitigated (flexibility increases). Thus, the sealability of the oil seal 27'' at its outer ring portion 29a can be ensured. To be more specific, if the stress in the outer ring portion 29a at the base portion of the intermediate ring portion 29c is high, the strength of the oil seal 27'' may lower. This embodiment can avoid such a problem.

Embodiment 4

Figure 4:
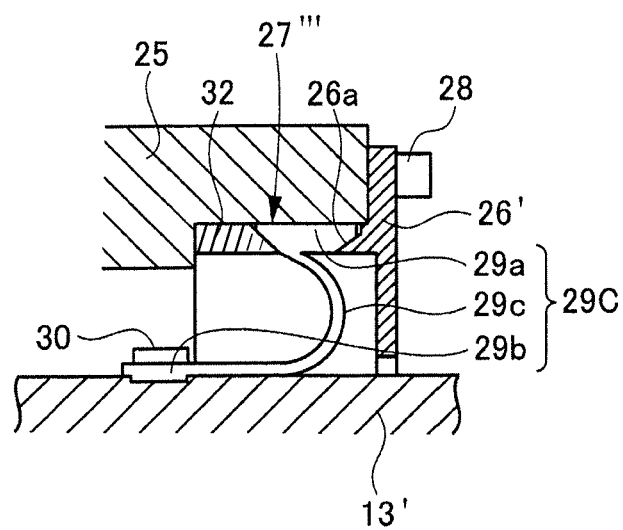
FIG. 4 is a sectional view of an oil seal portion showing Embodiment 4 of the present invention.

FIG. 4 is a sectional view of an oil seal portion showing Embodiment 4 of the present invention.

In this embodiment, an oil seal 27''' is a modified seal 27'' of Embodiment 2 above such that, instead of embedding the reinforcement ring 31 (see FIG. 2) in the outer ring portion 29a, at least one (both in the example shown) of end portions of the outer ring portion 29a in the width direction (the axial direction of the gear spindle) is formed in a wedge shape, and the outer ring portion 29a is sandwiched by a wedge-shaped retainer (wedge-shaped retention member) 32 and a seal plate 26' having a wedge-shaped portion (wedge-shaped retention member) 26a, the wedge-shaped retention members corresponding to the wedge shape of the corresponding end portion of the outer ring portion 29a. Other configurations are the same as Embodiment 2. Thus, components and portions that are the same as those in FIG. 2 are denoted by the same reference numerals as those used in FIG. 2, and are not described again here.

This configuration offers the following advantages in addition to similar operation and advantageous effects offered by Embodiment 2. Specifically, since the reinforcement ring 31 (see FIG. 2) is not embedded in the outer ring portion 29a, the low rigidity of the entire oil seal 27''' allows the oil seal 27''' to diametrically extend and contract before the oil seal 27''' is attached, and thus improves the assemblability. On the other hand, adequate sealability is attained after the oil seal 27''' is attached because the outer ring portion 29a is sandwiched by the wedge-shaped retainer 32 and the seal plate 26' having the wedge-shaped portion 26a.

Embodiment 5

Figure 5:
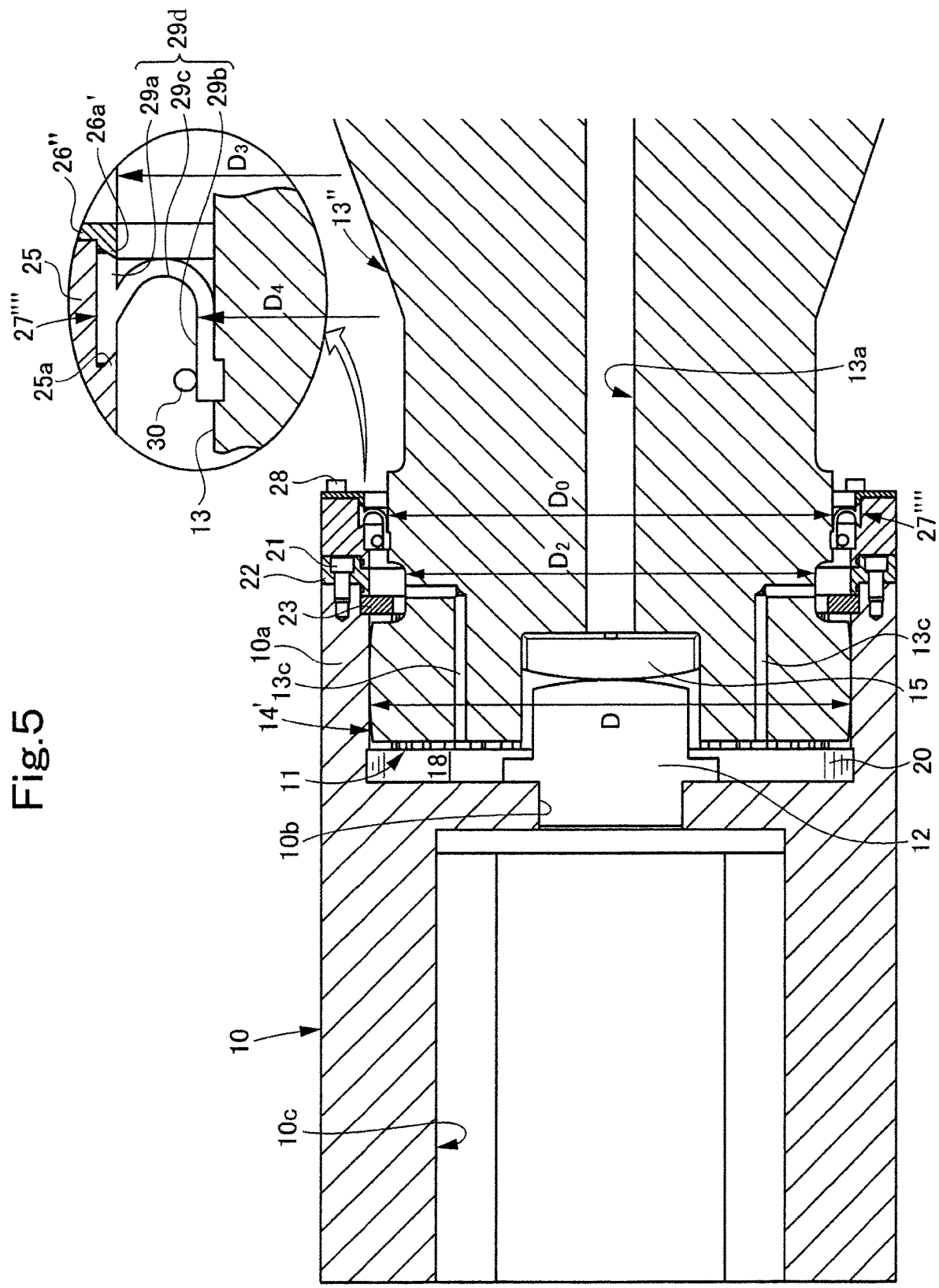
FIG. 5 is a sectional view of a main portion of a gear spindle showing Embodiment 5 of the present invention.
Figure 6:
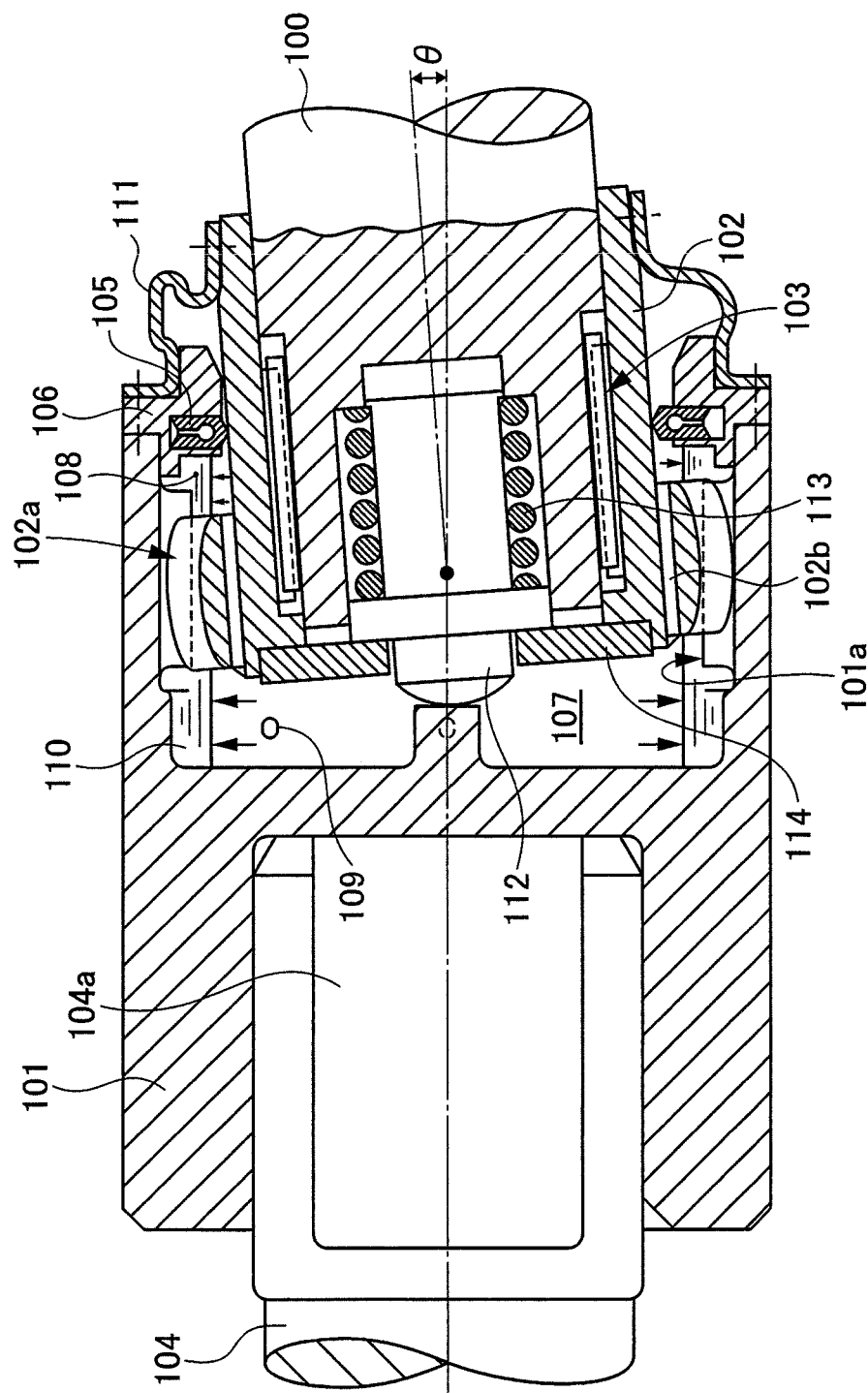
FIG. 6 is a sectional view of a main portion of a gear spindle according to a conventional example.

FIG. 5 is a sectional view of a main portion of a gear spindle showing Embodiment 5 of the present invention.

In this embodiment, the outer diameter $D_0$ of the oil seal attachment portion of Embodiment 1 is set to be larger than a diameter $D_2$ of the base of an inner cylinder gear portion 14', and the oil seal portion employs a structure slightly modified from the structure in Embodiment 4. Specifically, the outer ring portion 29a whose both end portions in the width direction are formed in a wedge shape is sandwiched by the seal case 25 having a wedge-shaped portion (wedge-shaped retention member) 25a and a seal plate 26'' having the wedge-shaped portion 26a', without using the wedge-shaped retainer 32 (see FIG. 4) employed in the oil seal portion of Embodiment 4. In addition, a highly rigid spring or solid band is used as the seal attachment member 30. Further, the helical compression spring 16 (see FIG. 1) in Embodiment 1 is not used, and the lubricating oil 20 supplied into the oil-supply-side oil chamber 18 through a cylinder hole (not shown) provided in the outer cylinder 10 is actively supplied to the seal-side oil chamber 19 through multiple communication holes 13c formed in the spindle inner cylinder 13. Other configurations are the same as Embodiment 1. Thus, components and portions that are the same as those in FIG. 1 are denoted by the same reference numerals as those used in FIG. 1, and are not described again here.

In a case where the specifications of an inner cylinder gear portion 14' (the outer diameter D of an spindle inner cylinder 13'' at the inner cylinder gear portion 14') are determined, the diameter $D_2$ of the base of the inner cylinder gear portion 14' is limited and cannot be set to a value larger than a certain value for reasons of machining of the gear portion. However, according to this embodiment, the following advantages can be offered in addition to similar operation and advantageous effects offered by Embodiments 1 and 4. Specifically, by setting the outer diameter $D_0$ of the oil seal attachment portion to be independently of the diameter $D_2$ of the base of the inner cylinder gear portion 14, the difference between the outer diameter D of the spindle inner cylinder 13" at the inner cylinder gear portion 14' and the outer diameter $D_0$ of the oil seal attachment portion can be set to be as small as possible. Thus, diametrical extension and contraction needed in attachment of the oil seal 27"" can be made small, which can improve the assemblability even more.

Generally, if the difference between an inner diameter $D_3$ of the outer ring portion 29a and an outer diameter $D_4$ of the inner ring portion 29b is large with the outer diameter $D_0$ of the oil seal attachment portion being constant, the seal's inner-pressure strength lowers due to the internal pressure of the lubricating oil 20 caused by rotation. However, the strength of seal deformation due to the slant of the spindle inner cylinder 13" improves. Thus, when the outer diameter $D_0$ of the oil seal attachment portion is set in view of the assemblability and strength of the oil seal, independently of the diameter $D_2$ of the base of the inner cylinder gear portion 14' as in this embodiment, the optimum dimensions can be set for the oil seal 27"" according to use conditions, independently of the diameter $D_2$ of the base of the inner cylinder gear portion 14'.

It goes without saying that the present invention is not limited to the embodiments described above, and can be variously modified in the shape of the oil seal and the like without departing from the scope of the present invention.

INDUSTRIAL APPLICABILITY

The gear spindle and the oil seal used therein according to the present invention are suitable for use in a drive device for a work roll in a rolling mill or the like.

EXPLANATION OF REFERENCE NUMERALS 10 spindle outer cylinder
10a large-diameter cylindrical portion (outer cylinder portion)
10b communication hole
10c fit hole
11 outer cylinder gear portion (internal teeth)
12 outer-cylinder pivot
13, 13', 13" spindle inner cylinder (inner cylinder portion)
13a cylinder hole
13b annular groove for positioning
13c communication hole
14, 14' inner cylinder gear portion (external teeth)
15 inner-cylinder pivot
16 helical compression spring
17 stopper
18 oil-supply-side oil chamber
19 seal-side oil chamber
20 lubricating oil
21 bolt
22 coupling cover (outer cylinder portion)
23 stopper ring
24 seal member
25 seal case (outer cylinder portion)
25a wedge-shaped portion (wedge-shaped retention member)
26, 26', 26" seal plate
26a, 26a' wedge-shaped portion (wedge-shaped retention member)
27, 27', 27''', 27"" oil seal
28 bolt
29, 29A, 29B, 29C, 29D seal body
29a outer ring portion
29b inner ring portion
29c intermediate ring portion
30 seal attachment member
31, 31a, 31b reinforcement ring
32 wedge-shaped retainer (wedge-shaped retention member)
A constant
B axial travel distance of spindle outer cylinder 10
D outer diameter of spindle inner cylinder 13 at inner cylinder gear portion 14
$D_0$ outer diameter of oil seal attachment portion
$D_1$ outer diameter of spindle inner cylinder 13 at a portion on the drive-shaft side
$D_2$ diameter of the base of inner cylinder gear portion 14
$D_3$ inner diameter of outer ring portion 29a
$D_4$ outer diameter of inner ring portion 29b
θ slant angle

The invention claimed is:

1. An oil seal used in a gear spindle, the oil seal comprising:
   a seal body; and
   a seal attachment member, wherein
   the seal body has an outer ring portion, an inner ring portion located on an inner peripheral side of the outer ring portion, and an intermediate ring portion connecting the outer ring portion and the inner ring portion to each other,
   the seal attachment is located on an outer peripheral side of the inner ring portion and configured to fix the inner ring portion from the outer peripheral side of the inner ring portion,
   the intermediate ring portion forms a U shape having a single large arc, and
   a reinforcement ring to give rigidity to the outer ring portion is embedded in the outer ring portion.

2. The oil seal according to claim 1, wherein the reinforcement ring is divided into multiple pieces in a width direction of the outer ring portion.

3. The oil seal according to claim 2, wherein the end portion of the intermediate ring portion connected to the outer ring portion is arranged between the divided pieces of the reinforcement ring.

4. The oil seal according to claim 1, wherein at least one of end portions of the outer ring portion in the width direction is formed in a wedge shape, and
   the outer ring portion is retained by wedge-shaped retention member coinciding in shape with the wedge shape of the end portion of the outer ring portion.

* * * * *